UNITED STATES PATENT OFFICE.

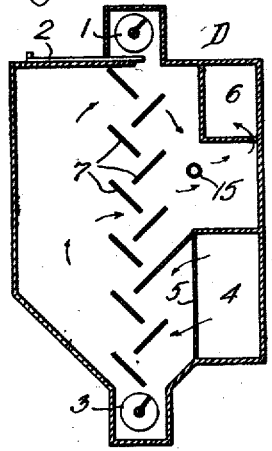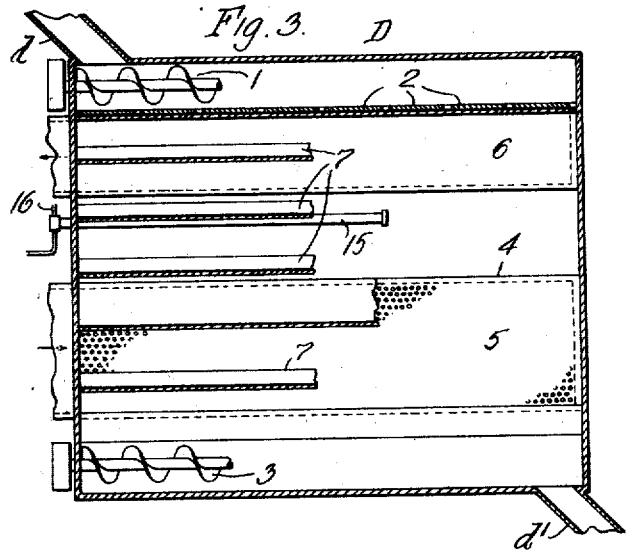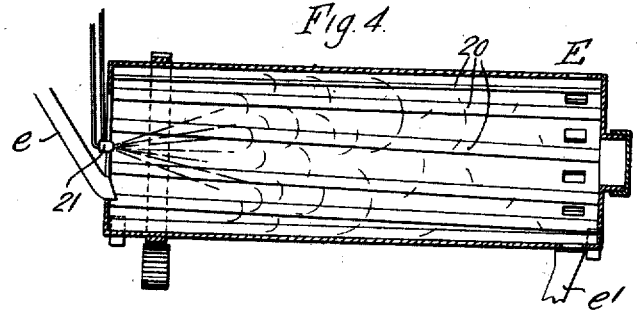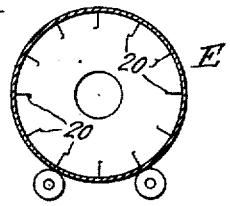

CHARLES WEBSTER ANDREWS, OF BUFFALO, NEW YORK, ASSIGNOR TO CARRIER ENGINEERING CORPORATION, OF NEW YORK, N. Y.

FLOUR-MILLING PROCESS.

1,381,266.   Specification of Letters Patent.   Patented June 14, 1921.

Application filed August 28, 1916. Serial No. 117,154.

*To all whom it may concern:*

Be it known that I, CHARLES WEBSTER ANDREWS, a citizen of the United States, residing at Buffalo, in the county of Erie and State of New York, have invented a new and useful Improvement in Flour-Milling Processes, of which the following is a specification.

This invention relates to flour milling processes and has for its objects to make the milling processes independent of the effect of variations in atmospheric conditions, which effect is particularly noticeable and objectionable on hot, humid days; to make the flour separate more readily from the bran; and by controlling the condition of the stock in the milling process to materially increase the yield and the quality of high grade flour.

In the milling of flour the stock becomes heated in the grinding rolls to a materially higher temperature than ordinarily prevails in the spouts, conveyers and separating machines through which the stock passes from the rolls, so that changes of temperature in the stock and changes in the vapor pressure of the atmosphere in contact with the stock occur which interfere seriously with the proper milling of the stock and lessen the yield of high grade flour. For instance, the heat may dry the stock enough to leave the bran so brittle that it is finely ground up with the flour and cannot be readily separated therefrom, and the temperature of the stock being higher than that of the air and the chutes and other apparatus with which the stock comes into contact, causes the rolls, bolters, spouts, etc., to sweat and moisten the stock so that it pastes up the bolting silks and interferes with the separating process. Conditions are much less favorable to good yields in summer than in winter because temperatures and humidities are higher in summer and lessen the cooling effect of the present suction systems on the rolls and other apparatus.

It is recognized that there is a close relationship between the atmospheric conditions within the mill and the percentage of high grade flour yield, and after careful observations, comparisons and experiments, extending over a considerable period of time, I have determined that yields of high grade flour can be obtained considerably in excess of the yields heretofore obtained under the most favorable milling conditions by cooling the heated flour stocks, preparatory to the separating processes in the bolters, reels, etc., to the temperatures best conformable to the separating processes. The best results are secured by maintaining suitable atmospheric conditions within the mill, particularly in the room containing the grinding rolls, where a great deal of heat is developed, in addition to directly cooling the stocks before they reach the separating apparatus, so that the vapor pressure of the moisture of the stocks will be less than the vapor pressure corresponding to the temperature of the atmosphere (and incidentally of the apparatus) with which the stocks come into contact after leaving the rolls, and also where necessary, increasing the moisture content of the stocks after leaving the separating apparatus and before the subsequent reduction thereof.

It may be said, in explanation of the foregoing, that a certain relationship exists between the temperature and moisture content of hydroscopic materials, among which flour may be classed, and the temperature and relative humidity of the atmosphere surrounding the material. It is usual, in speaking scientifically of this relationship to use the terms vapor pressure of the moisture in the material and vapor pressure of the water vapor in the air. When these two vapor pressures are equal, for all practical purposes, it may be said that the processes of absorption and evaporation cease, and a definite constant relationship between the moisture content of the material and the relative humidity of the atmosphere results. The vapor pressure of the moisture in the material depends both upon the percentage of moisture which it contains and the temperature of the material. That is, the vapor pressure increases both with the moisture content of the material and also with the temperature of the material. For example, material with a relatively low moisture content but at high temperature will have its vapor pressure increased above that of the surrounding air so that it will give off moisture even in air that is nearly saturated. It may thus be understood that by reducing the vapor pressure of the moisture in the material by lowering the temperature of the material itself, that the tendency of the material to give off moisture to the surrounding atmosphere is greatly reduced. In this wise, the condensation which occurs in the spouts, conveyers, bolters, reels, etc., and which is so objectionable, can be entirely prevented by keeping the vapor pressure of the atmosphere in immediate contact with the material in its passage through the aforementioned apparatus from ever reaching a point that is greater than the vapor pressure corresponding to the temperature of the atmosphere that is in contact with the outside of these spouts, conveyers, bolters, reels, etc.

The stocks can be cooled in various ways, as, for instance by passing a cooling medium through the hollow grinding rolls, but preferably the cooling is effected by causing the stocks leaving the rolls to be evenly distributed in thin streams or curtains through which are passed currents of air which have been saturated or substantially saturated with moisture at a suitable temperature, usually between 40° to 60° F., and regulating the volume of air supplied so as to secure the required reduction in temperature of the stocks. By using saturated air at the proper temperature, the necessary cooling of the stock is effected under ordinary conditions with but a very slight reduction in the moisture content of the stock. This slight loss in moisture can be again supplied to the stocks between the separating apparatus and subsequent grinding rolls. The air is saturated, not for moistening the stock but for cooling it without unduly reducing its moisture content. While the use of air saturated at a predetermined temperature insures certainty and uniformity of results, and is therefore preferably employed, less perfect, but good results can be secured by the use of humidified air which is not fully saturated.

The apparatus preferably employed in carrying on the process is constructed as follows:—

In the accompanying drawings:—

Figs. 2 and 3 are respectively a cross section and a longitudinal section of the stock conditioning device.

Figs. 4 and 5 are respectively a longitudinal and a cross section of the stock moistening device.

Figure 1:
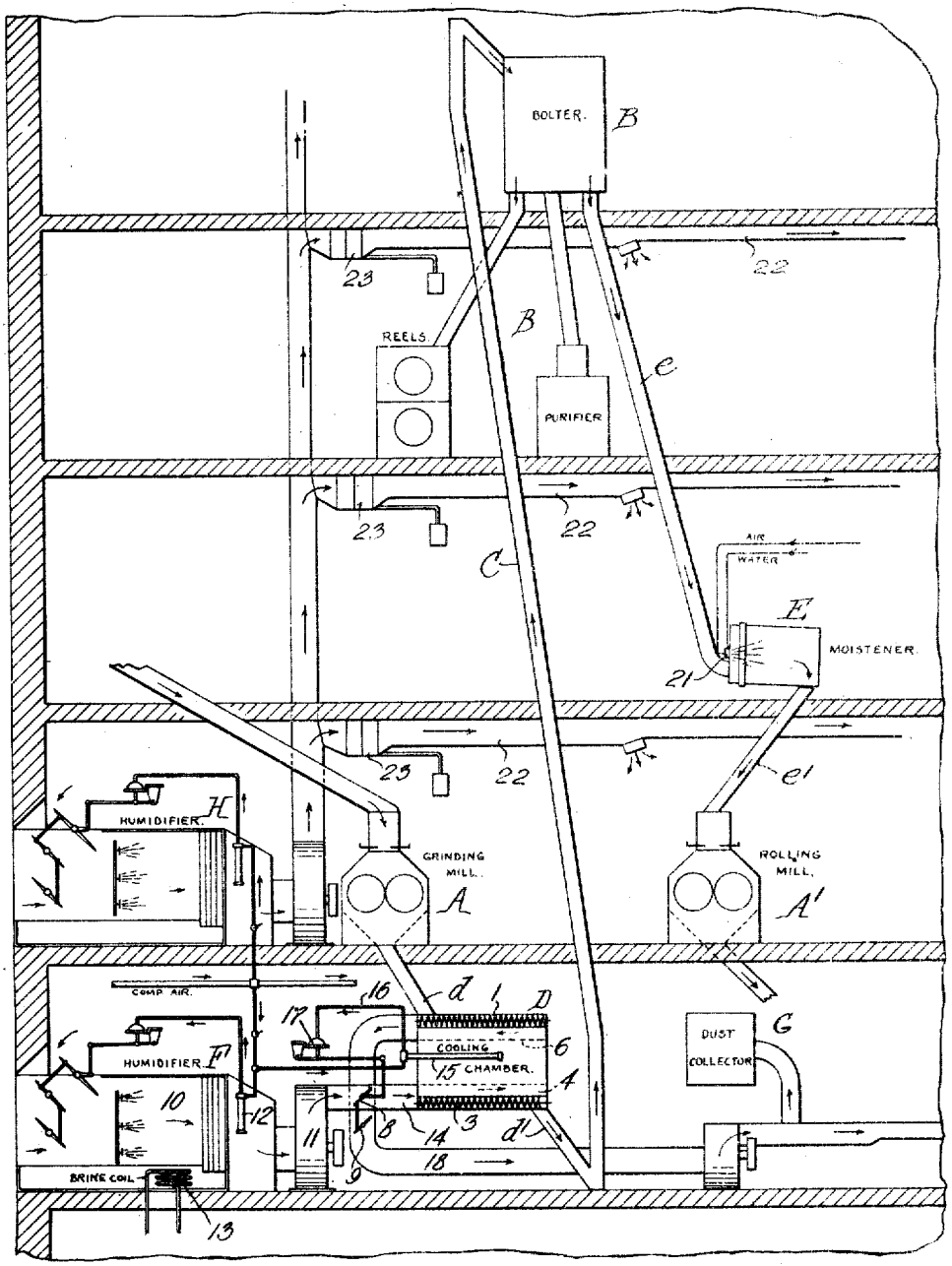
Figure 1 is a diagrammatic sectional view of the apparatus.

A A' represent two sets of grinding rolls and B a separating apparatus, which may be the bolter, reel, purifier or other separating apparatus through which the stock passes from one set of rolls A and from which the unfinished stock passes to the other set of rolls A'. The rolls A may be either for the first break or for a subsequent reduction of the stock while the rolls A' may be the rolls for the second or any subsequent grinding of the unfinished stock from the separating apparatus. C represents an elevator for delivering the stock from the rolls A to the separating apparatus. All of these devices are parts of the usual flour mill and may be of any suitable construction and arrangement.

D represents a stock conditioning or cooling device through which the stock passes on its way from the rolls A to the separating apparatus B and in which the stock is subjected to the cooling action of the humidified air, and E represents a moistening device, located between the separating apparatus and the second grinding rolls A', in which the moisture content of stock may be increased preparatory to further reduction by the rolls A'. As shown in the drawings, the stock is delivered from the rolls A to the conditioning device D through a chute d and passes from the conditioning device through a chute d' to the elevator, while the unfinished stock is delivered from the separating apparatus to the moistening device E and from the latter to the reduction rolls A' by chutes e and e' respectively.

The conditioner or cooling device D preferably comprises a box or chamber provided at its upper portion with a screw conveyer 1 and adjustable gates 2, or other means whereby the stock from the rolls A is evenly distributed throughout the width of the chamber and caused to fall through the chamber in a thin sheet or curtain, and provided at its lower portion with a screw conveyer or other suitable device 3 for discharging the stock from the conditioning chamber. An air supply duct 4 is arranged in the lower portion of the conditioning chamber, the duct having a perforated wall 5 and being tapered to evenly distribute the air throughout the length of the conditioning chamber, and an exhaust duct 6 also preferably tapered, is located in the upper portion of the chamber. The stock in falling through the conditioning chamber strikes oppositely inclined baffles or plates 7 which are separated by spaces through which the air can pass from the supply duct to the exhaust duct through the falling stock, thus insuring an intimate and thorough contact of the air with the stock. The air supply duct is provided with a damper 8 to regulate the volume of air supplied to the conditioning chamber and the exhaust duct is also preferably provided with a damper 9 interconnected with the supply damper in such a way as to regulate the exhaust in accordance with the supply, i. e., so that practically the same quantity of air is exhausted from the conditioner as is supplied thereto. A conditioner or cooling device of any other suitable construction which will insure a thorough and uniform distribution of the air in proper volume through the stock could be employed, but the construction above described is efficient and desirable for the purpose.

The air supplied to the conditioner or cooling device preferably has a suitable predetermined dew point or is saturated with moisture at a predetermined temperature so as to have a definite moisture content. This can be accomplished by any suitable air refrigerating or conditioning apparatus. In the apparatus indicated at F in the drawings for this purpose, which is of known construction, the air is drawn through cold water sprays in a cooling chamber 10 by a fan 11, the temperature of the chamber being controlled by regulating the temperature of the spray water and properly proportioning the amounts of fresh air and return air from the mill entering the cooling chamber, or otherwise, under the control of a thermostat 12, which is affected by the temperature of the saturated air, so that the air is saturated at a definite temperature, depending upon the adjustment of the apparatus. A refrigerating coil 13 is shown for cooling the spray water which cools the air. Means can also be provided for raising the temperature of the air, if this becomes necessary in cold weather. In the ordinary operation of the process the absolute humidity of the air entering the refrigerating apparatus F is such that when the air is cooled it is dehumidified and leaves the apparatus substantially saturated at the temperature for which the apparatus is adjusted, which is ordinarily between 40° and 60° F. While the air refrigerating or dehumidifying apparatus shown is of the spray type in which the air is cooled by contact with cold water sprays, any other suitable type of refrigerating or dehumidifying apparatus could be employed, such, for example, as the well known condenser coil type in which the air is cooled by contact with the coils of pipe through which a cooling medium circulates.

The air thus saturated at the required predetermined temperature is delivered by the fan 11 through a discharge conduit 14 to the stock conditioner D. The volume of the saturated air delivered to the stock conditioner can be regulated with reference to the temperature and quantity of the stock so as to secure the required cooling of the stock by adjusting the controlling dampers 8 and 9 by hand, but the regulation is preferably performed automatically as by means of a thermostat 15 which is located in the stock conditioning chamber and is affected by the temperature of the stock or of the air after it has passed through the stock. This thermostat preferably controls the flow of compressed air through a pipe 16 to a diaphragm or motor 17 for actuating the air supply and exhaust dampers 8 and 9. A thermostat of any usual or suitable construction can be employed and it can operate the dampers through any suitable instrumentalities.

As shown, the air exhaust duct of the stock conditioner D is connected by a pipe 18 with a dust collector G for separating from the air any dust or stock therein, and the air may be discharged from this dust collector into the mill for cooling the latter and returned to the air conditioning device F to be again conditioned and returned properly saturated and tempered to the stock conditioner D.

The volume of the conditioned air with reference to the temperature of the stock is so controlled either by hand or automatically as described, that the stock flowing from the rolls A will be sufficiently cooled so that the vapor pressure of the moisture in the stock always will be less than the vapor pressure corresponding to the temperature of the atmosphere or the apparatus with which the stock subsequently comes into contact. The chutes, elevators and separating apparatus, therefore, will not sweat and cause the condensation of moisture on the stock and the stock will pass to the separating apparatus in the condition most suitable for separation. One of the stock conditioners D can be provided for cooling the stock, leaving any one or more of the sets of grinding rolls in the mill as may be found necessary, and the supply of saturated air to each conditioner will be independently controlled as above indicated in accordance with the temperature of the stock being treated in this conditioner.

Any suitable means can be used to produce the desired moisture content in the stock. The moistening device E shown comprises an inclined rotary drum into which the stock is delivered at one end and which is provided interiorly with suitable oblique flights 20 adapted to carry the stock up and let it fall through the chamber of the drum to be moistened by a very finely atomized water spray or steam from a suitable device or atomizer 21. The moistening of the stock can be suitably controlled by proper regulation of the water and compressed air supply of the atomizer. Instead of using atomized water, steam can be used with cool saturated air, which produces a fine fog or mist free from drops and will therefore insure a very accurate, uniform moistening of the stock. The moistened stock passes from the moistening device E to the grinding rolls A'. As the stock is not moistened until after it leaves the separating apparatus, the separating operation is not impeded or affected in any manner by the added moisture in the stock.

H represents an air conditioning apparatus for supplying air to the grinding room purifiers and reels or other parts of the mill suitably conditioned with reference to humidity and temperature for maintaining the most suitable atmospheric conditions in the several parts of the mill. This apparatus can be similar to the air conditioning apparatus F or of any other suitable construction. One apparatus H is shown for supplying air to several of the mill rooms, but one or more air conditioners will be employed, depending upon the size of the mill and the atmospheric conditions prevailing therein. The atmospheric conditions in the several parts of the mill can be maintained as required by any known or suitable means, it being understood that the conditions are regulated so as to coöperate to the best advantage with the stock conditioning means in maintaining the stock at the conditions of temperature and moisture best suited to the operations to be performed on the stock. As shown, the air supply pipe 22 for each room is equipped with a heater 23 under the control of a hygrostat 24 in the room. These hygrostats can be set so as to maintain the required atmospheric conditions in the several rooms.

I claim as my invention:—

1. The herein described process of milling flour, which consists in grinding the stock, cooling the ground stock by subjecting the same to the action of humidified air having a temperature lower than the temperature of the room, and regulating the volume of the humidified air under the control of the temperature of the stock to cool the stock to a predetermined temperature.

2. The herein described process of milling flour which consists in grinding the stock, cooling the ground stock by subjecting the same to the action of the air which is saturated with moisture at a definite temperature, and regulating the volume of the saturated air under the control of the temperature of the stock to cool the stock to a predetermined temperature.

3. The herein described process of milling flour which consists in grinding the stock, cooling the ground stock by subjecting the same to the action of humidified air having a temperature lower than the temperature of the room, and automatically regulating the volume of the humidified air to cool the stock to a predetermined temperature.

4. The herein described process of milling flour which consists in grinding the stock, cooling the ground stock by subjecting the same to the action of humidified air having a temperature lower than the temperature of the room, regulating the volume of the humidified air under the control of the temperature of the stock to cool the stock to a predetermined temperature, and then separating the different parts of the stock.

5. The herein described process of milling flour which consists in grinding the stock, cooling the ground stock to a temperature such that the vapor pressure of the moisture in the stock is less than the vapor pressure corresponding to the temperature of the air and apparatus with which the stock subsequently comes into contact, and maintaining a substantially uniform temperature and humidity of the surrounding atmosphere in the mill.

Witness my hand, this 26th day of August, 1916.

CHARLES WEBSTER ANDREWS.

Witnesses:
C. W. PARKER,
M. J. PITTMAN.